No. 862,701. PATENTED AUG. 6, 1907.
W. H. BRADT.
TROLLEY WHEEL.
APPLICATION FILED DEC. 5, 1906.

WITNESSES

INVENTOR
William H. Bradt
BY
ATTORNEYS

UNITED STATES PATENT OFFICE.

WILLIAM H. BRADT, OF SCHENECTADY, NEW YORK.

TROLLEY-WHEEL.

No. 862,701.  Specification of Letters Patent.  Patented Aug. 6, 1907.

Application filed December 5, 1906. Serial No. 346,364.

*To all whom it may concern:*

Be it known that I, WILLIAM H. BRADT, a citizen of the United States, and a resident of Schenectady, in the county of Schenectady and State of New York, have invented a new and Improved Trolley-Wheel, of which the following is a full, clear, and exact description.

This invention relates to certain improvements in trolley construction, whereby there are provided two wheels revolving parallel on the same shaft, the object being to improve the contact of the wheels with the trolley wire, to prevent sparking, and to increase the life and efficiency of the apparatus.

Reference is to be had to the drawings forming a part of this specification, in which similar characters of reference indicate corresponding parts in both the figures.

Figure 1:
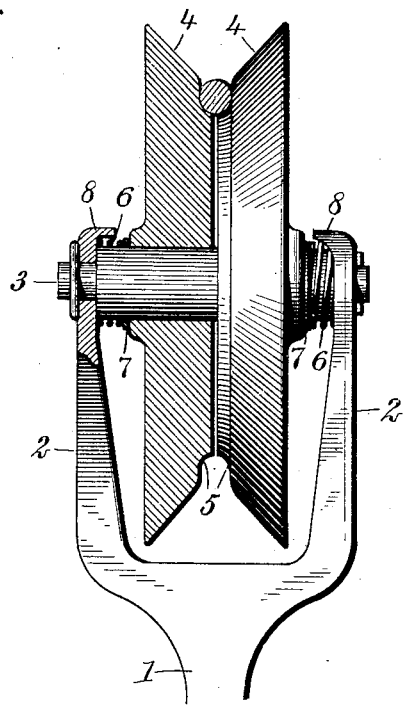
Figure 2:
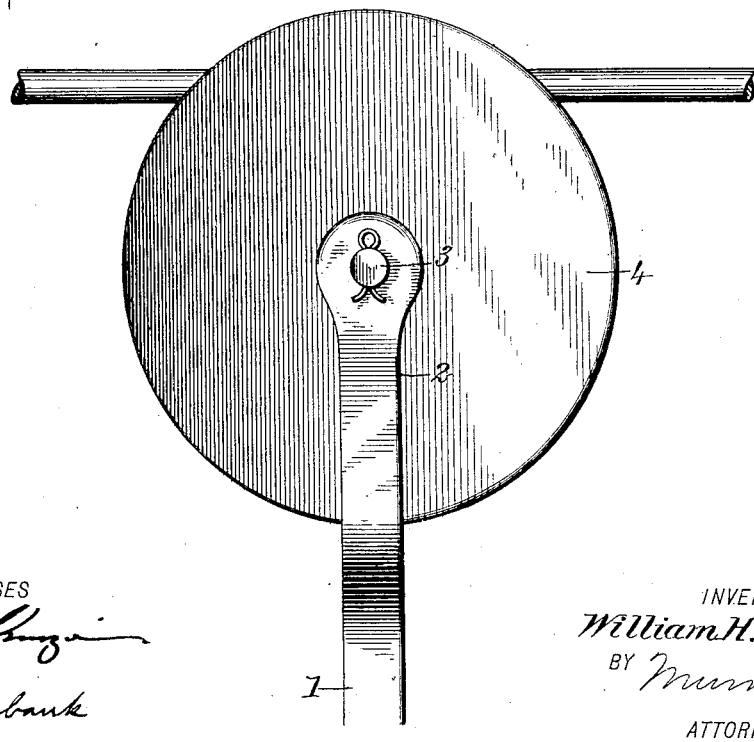

Figure 1 is a vertical elevation of an improved device showing one of the wheels thereof in section; and Fig. 2 is a side elevation.

In the form of the invention illustrated there is employed, the ordinary trolley pole 1, having forks 2, 2, in which the shaft 3 is journaled in any suitable manner. On the shaft 3 there are employed two wheels 4, 4, each having the outer circumferential face inclined at an angle toward the adjacent wheel, and the edge of each wheel is cut away to form a groove 5 facing the groove in the opposite wheel. These two grooves when taken together, form a channel slightly less in width than is the diameter of the trolley wire fitting therein; and to hold the wheels the proper distance apart and at the same time causing them to properly contact with the trolley wire, there is provided a coiled spring 6, on each end of the shaft between the fork and the wheel, whereby the wheels are yieldingly held together, and may be separated a sufficient distance for the insertion of the trolley wire. To reduce the friction, a washer 7 is preferably employed between each of the wheels and its spring.

To prevent the wire from accidentally coming in contact with the springs 6, the ends of the forks of the trolley pole are preferably provided with guards 8, 8, which extend over the springs on the side opposite the trolley pole, and also serve to prevent the accumulation of snow on the spring and interfere with its operation.

In the employment of the improved trolley, the pole is held up with sufficient force to force the trolley wire into the groove between the two wheels and as the wheels contact with the wire throughout substantially one-half the circumference of the wire, it is evident that as perfect contact as possible is thereby formed, while the pressure of the coiled springs holds the wheels against the sides of the wire.

Due to the large area of contact, there is no sparking as the wheel rotates along the wire; as the parts are yieldingly held in the desired position the amount of wear is very materially reduced.

Having thus described my invention I claim as new, and desire to secure by Letters Patent:

1. A trolley including two wheels mounted upon a common axis and having their adjacent faces normally in contact, and means for permitting axial movement of one of said wheels in respect to the other, the circumferential face of each wheel being inclined toward the other wheel and provided with a groove on the edge adjacent said wheel, the grooves of the two wheels forming a contact for the trolley wire.

2. A trolley, comprising a shaft, two wheels mounted on said shaft, the circumferential face of each wheel being inclined toward the other wheel, and provided with a groove on the edge adjacent said wheel, the grooves of the two wheels forming a contact for the trolley wire, and means for holding said wheels in contact with each other.

3. In combination, a trolley pole having journals at its end, a shaft mounted in said journals, two wheels mounted on said shaft, the said wheels having their circumferential faces inclined toward each other, and provided with a groove to receive the trolley wire, springs on said shaft, tending to hold the wheels in contact with each other, and guards for said springs.

In testimony whereof I have signed my name to this specification in the presence of two subscribing witnesses.

WILLIAM H. BRADT.

Witnesses:
 HENRY BRADT,
 WILLIAM R. HOTALING.